United States Patent
Boorsma et al.

(10) Patent No.: US 6,370,002 B1
(45) Date of Patent: Apr. 9, 2002

(54) ELECTROMAGNETIC OPERATION OF THE PROCESSING OF OBJECTS

(75) Inventors: P. R. Boorsma, Dokkum; C. A. Munneke, Surhuisterveen, both of (NL)

(73) Assignee: Neopost B.V., Drachten (NL)

( * ) Notice: Subject to any disclaimer, the term of this patent is extended or adjusted under 35 U.S.C. 154(b) by 0 days.

(21) Appl. No.: 09/436,249

(22) Filed: Nov. 9, 1999

(30) Foreign Application Priority Data

Nov. 9, 1998 (NL) .............................................. 1010512

(51) Int. Cl.⁷ .......................... F16H 61/06; G05B 19/21
(52) U.S. Cl. ........................... 361/195; 361/28; 702/89; 324/527
(58) Field of Search .................... 361/153, 160, 361/154, 195, 23, 28; 192/84.1; 702/89, 113; 324/527, 601

(56) References Cited

U.S. PATENT DOCUMENTS

| | | | |
|---|---|---|---|
| 3,934,690 A | | 1/1976 | Janning |
| 4,743,821 A | * | 5/1988 | Hall ........................... 318/599 |
| 4,829,221 A | | 5/1989 | Grunberg et al. |
| 4,985,013 A | | 1/1991 | van der Werff et al. |
| 5,293,551 A | * | 3/1994 | Perkins et al. ............... 361/154 |
| 5,899,050 A | | 5/1999 | Bergwerf |
| 6,021,038 A | * | 2/2000 | Hanchett, Jr. ................ 361/156 |
| 6,188,562 B1 | * | 2/2001 | Lutz et al. ................... 361/154 |
| 6,249,419 B1 | * | 6/2001 | Casellato .................... 361/160 |

FOREIGN PATENT DOCUMENTS

| | | |
|---|---|---|
| EP | 182515 | 10/1985 |
| EP | 709602 | 11/1990 |

OTHER PUBLICATIONS

Description entitled "Model EC20 Economy Electric Spring Clutch" by Reell Precision Manufacturing Corporation, St. Paul, Minnesota, USA.

* cited by examiner

*Primary Examiner*—Josie Ballato
*Assistant Examiner*—Kim Huynh
(74) *Attorney, Agent, or Firm*—Burns, Doane, Swecker & Mathis, L.L.P.

(57) ABSTRACT

In an electromagnetic operating system having a coil for electromagnetically controlling a mechanical operating member for operating the processing of objects in response to an alteration in an electrical voltage condition, the control system is arranged for generating test command pulses of different magnitude, for registering a command code in accordance with a smallest magnitude test command pulse causing the operating member to move, and for subsequently correcting alterations in the voltage condition for controlling the operating member in accordance with the registered command code. The control system is responsive for effecting the corrections in the alterations of the voltage condition in accordance with the registered command code. This enables simple correction for differences in the response delay among different electromagnetic operating systems.

10 Claims, 2 Drawing Sheets

ELECTROMAGNETIC OPERATION OF THE PROCESSING OF OBJECTS

FIELD AND BACKGROUND OF THE INVENTION

This invention relates to an electromagnetic operating system for operating the processing of objects, including an operating member responding with a delay having a duration to which a tolerance applies. The invention further relates to a method for electromagnetically controlling an operating member responding with a delay having a duration to which a tolerance applies.

Such an electromagnetic operating system and such a method for operating the processing of objects are known from practice, for instance in the form of an operating system with an electromagnetically operated wrap spring clutch, and in the form of operating an operating member using such a clutch, respectively.

An example of an electromagnetic wrap spring clutch is a clutch of the type EC20 which is commercialized by Reell Precision Manufacturing Corporation, St. Paul, Minn., U.S. In the use of such clutches, the accurate control of the moment at which the clutch in effect engages is of great importance in various applications, for instance because this determines when a transport roller for transporting sheets of paper is set in motion, thereby determining, for instance, in what relative position with respect to another object an object is added to a transport along a path.

In many other applications an accurate control of the time at which an operating member is set in motion is of great importance as well, such as operation of a nip in which an envelope is retained or transported back to cause it to buckle (see, for instance U.S. Pat. No. 5,899,050) and operations of folding knives with which one or more sheets can be urged into the nip between a pair of folding rollers (see, for instance, U.S. Pat. No. 4,985,013).

A problem of such electromagnetic operating systems is that the delay with which the operating member responds to the alteration of the electric voltage condition the coil is in, varies from one specimen to another, which does not enable sufficiently accurate control of when the operating member is moved. This plays a role in particular when the response of the operating member in turn comprises a further action, such as operating, engaging or carrying along a further part.

It is known to limit the spread of response times of an electromagnetically controlled or driven operating member by limiting manufacturing tolerances, but this generally entails a substantial increase in cost and contributes little to counteracting the drift of the response time as a result of alterations in operating conditions and as a result of running in and wear.

SUMMARY OF THE INVENTION

It is an object of the invention to provide a low cost solution which enables a more accurate determination of the moment at which an operating member is moved or stopped and by which drift of the response time as a result of altered conditions or running in or wear can be limited in a simple manner.

This object is achieved according to the present invention by providing an electromagnetic operating system for operating the processing of objects, including: at least one coil for converting an electric current into a movement; an operating member movable in response to an alteration larger than a minimum voltage change of an electrical voltage condition across the coil, for operating the processing of objects, the operating member operatively responding to the alteration with a delay having a duration to which a tolerance applies; and a control system for effecting alterations of the electrical voltage condition across the coil; wherein the control system is arranged for generating different test command pulses having dimensions including a duration and a voltage, the test command pulses each comprising effecting an alteration of the voltage condition larger than the minimum voltage change, which test command pulses are of mutually different magnitude as regards at least one of the dimensions thereof and at least one of the test command pulses having a duration shorter than the delay; for registering a command code in accordance with a smallest magnitude test command pulse having caused the operating member to move; and for subsequently applying corrections in accordance with the registered command code to the alterations in the voltage condition for operating the operating member when in operation.

This object can further be achieved according to the present invention by providing a method for electromagnetically controlling an operating member for operating the processing of objects, including making an alteration larger than a minimum voltage change to an electrical voltage condition across a coil, such that the operating member for operating the processing of objects is moved, the operating member operatively responding to the alteration of the voltage condition with a delay having a duration to which a tolerance applies; further including the steps of:

generating different test command pulses having dimensions including a voltage and a duration, the test command pulses each including effecting an alteration of the voltage condition larger than the minimum voltage change, which test command pulses are of mutually different magnitude as regards at least one of the dimensions and at least one of the test command pulses having a duration shorter than the delay;

registering a command code in accordance with a smallest magnitude test command pulse which has caused the operating member to move; and subsequently applying corrections in accordance with the registered command code to the alterations in the voltage condition for operating the operating member when in operation.

By making use of test command pulses of which the magnitude is varied so as to determine the minimum magnitude test command pulse causing the operating member to respond, in a simple manner an indication is obtained of the delay of the operation of the operating member or regarding the manner in which the command is to be carried out to achieve a predetermined delay. It is, for instance, not necessary to measure the delay, and whether the operating member moves or not can be established with simple sensors, or can be simply established by service personnel through the senses or with very simple equipment.

Particular exemplary embodiments of the invention are set forth in the dependent claims.

Hereinafter, further objects, embodiments, advantages and details of the invention are described on the basis of a few exemplary embodiments, referring to the drawings.

DETAILED DESCRIPTION

Figure 1:
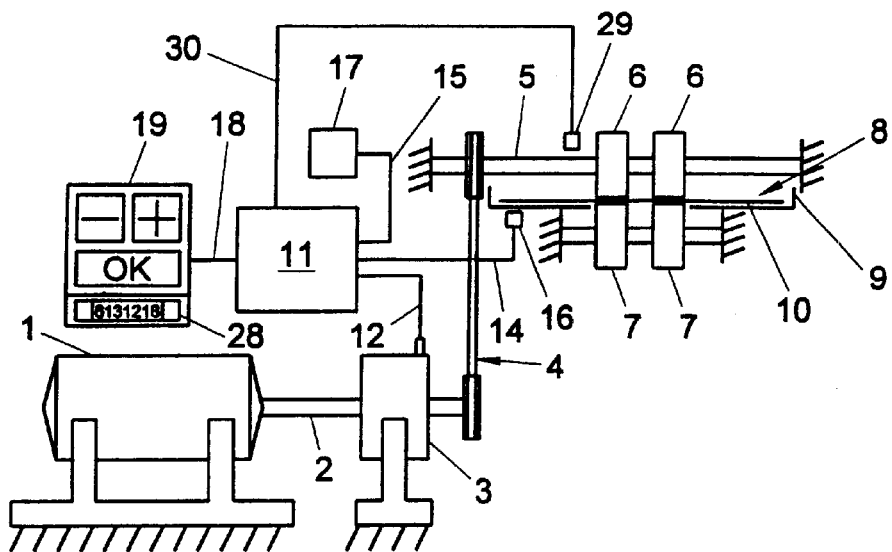
FIG. 1 is a schematic representation of a system with an electromagnetically operated clutch.
Figure 2:
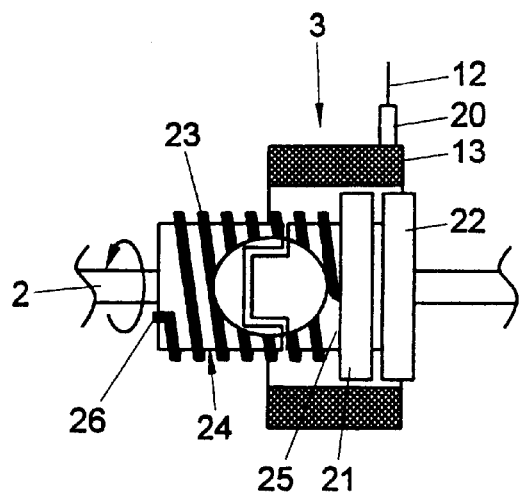
FIG. 2 is a cutaway representation of an electromagnetic clutch.

The system shown in FIG. 1—which is the embodiment of the invention which is presently preferred most—of which the clutch shown in FIG. 2 forms a part, is supported by a supporting structure, of which relevant portions in the context of this example are indicated by hatching. The system is made up of a motor 1 having an output shaft 2, a clutch 3 connected to the output shaft 2, a belt transmission 4 for distributing rotation of the output shaft 2 to a number of driven shafts, of which one shaft 5 is shown in FIG. 1, transport rollers 6 mounted on the driven shaft 5 so as to be restrained from rotation relative thereto, and counter rollers 7 which, together with the transport rollers 6, form a nip in a transport path 8. The transport path 8 is further determined by side guides 9 for sheets 10 passing through the nip between the rollers 6, 7.

For controlling the clutch, a control system 11 is connected with the clutch 3 via a line 12, for applying a voltage across a coil 13 of the clutch 3. The control system 11 is further connected with sensors 16, 17 via lines 14, 15 and with an input device 19 via a line 18. In operation, the sensor 16 signals whether a sheet in the path 8 has reached a particular position, and the sensor 17 signals whether in a further path downstream of the transport rollers 6, 7 a position is available for receiving a sheet 10.

The coil 13 is arranged for generating, in response to a voltage on the terminal 20 and an electric current thereby flowing through the coil, a magnetic flux which presses a switching ring 21 axially against a shoulder 22 of a clutch part which is driven in coupled condition. The switching ring 21 is coupled with a wrap spring 23. The wrap spring is arranged for transmitting a couple form a clutch part 24 which drives in coupled condition, to a clutch part 25 which is driven in coupled condition. Adjacent a bent end 26 thereof, the spring 23 is permanently connected with the clutch part 24 which drives in coupled condition.

When the switching ring 21 is pressed against the shoulder 22, the spring 23 is axially extended, giving rise to friction between the shoulder 22 and the switching ring 21, whereby the spring 23 is clamped about the aligned cylindrical circumferential surfaces of the two clutch parts 24, 25. As a result, the spring wraps tightly about those clutch parts 24, 25 and it transmits a couple from the driving clutch part 24 to the driven clutch part 25. Such clutches are commercially available from Reell Precision Manufacturing Corporation, St. Paul, Minn., U.S. When the electrical voltage on the terminal 20 is removed, the spring 23 unwinds again, so that the clutch parts 24, 25 are uncoupled from each other.

In operation, the motor 1 rotates continuously and, depending on signals coming from the sensors 16, 17, the clutch 3 is controlled for coupling and uncoupling the clutch 3. As a result, sheets 10 are transported at times determined by the control system 11.

Between the alteration of the electrical voltage condition across the coil 13 and the change of the rotary speed of the transport rollers 6, there always arises a delay, inter alia because the magnetic flux, when the voltage is applied, is not directly at the intended level and because the switching ring 21 must first move before the driven clutch part 25 is carried along. Further, some elasticity is present in the transmission between the clutch 3 and the rollers 6. This delay can in principle be compensated by the control system 11 by applying the voltage to the terminal 20 at a correspondingly earlier time.

If the magnitude of that delay is not sufficiently accurately known, the moment at which the rollers 6, 7 start rotating or stop rotating cannot be determined sufficiently accurately. It is possible, for instance, to limit variation in the delay among different systems by manufacturing the clutch 3 and the transmission very accurately and/or by testing each system and setting it depending on the measured delay, but this has the effect of greatly increasing costs. Also compensating for altered operating conditions and wear is then laborious and costly, because special equipment is necessary to measure the delay between the voltage being switched on or off and the rollers 6, 7 starting and stopping.

Figure 3:
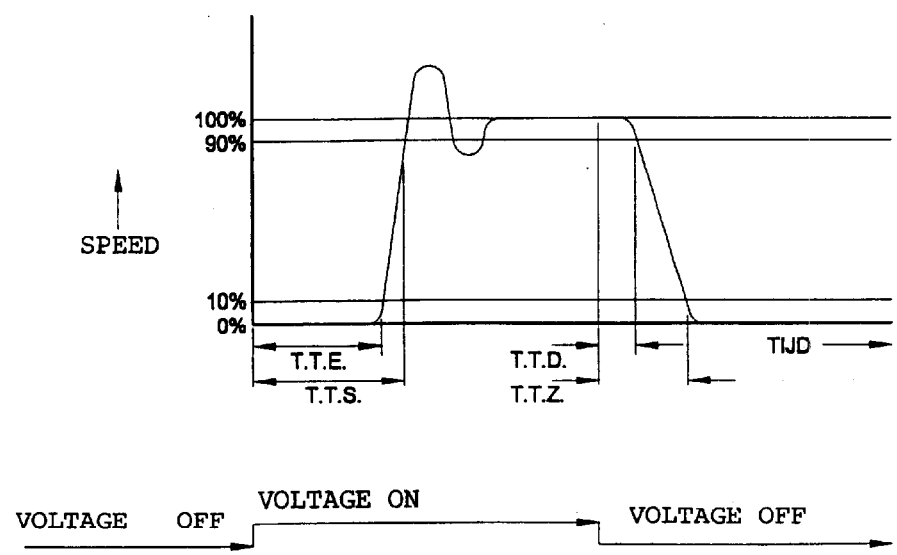
FIG. 3 is a combined switching and time/speed diagram of an example of a commercially available clutch.

The delay arising at the clutch is illustrated with reference to a time/speed diagram shown in FIG. 3, which is an adaptation of a time/speed diagram (source: Reell Precision Manufacturing Corporation, St. Paul, Minn., U.S.) of a commercially available, electrical wrap spring clutch. The speed on the Y-axis in FIG. 3 indicates the speed of the transport rollers 6. After a voltage is applied across the coil 13 at time t=0, it takes some time before the magnetic flux has become sufficiently high to cause the switching ring 21 to move and the switching ring 21 has moved sufficiently to cause the wrap spring 23 to engage the clutch part 25 to be carried along. The period T.T.E. (time to engage) is here defined as the time needed to accelerate the rollers 6 to a speed of 10% of the final speed with the clutch 3 in coupled condition. This time, incidentally, is dependent on the speed of the output shaft 2 and is shorter according as the shaft 2 rotates faster. The time T.T.S. (time to speed) needed to accelerate the rollers 6 to 90% of the final speed with the clutch 3 in coupled condition is only little longer than time T.T.E.

Also at switch-off, two measures for the occurring delay are distinguished, viz. T.T.D. (time to disengage) and T.T.Z. (time to zero). The T.T.D. is the time between switching off the voltage on the terminal 20 and the decrease of the speed of the rollers 6 to a value of 90% of the original speed. The T.T.Z. is the T.T.D. plus the time needed to allow the speed of the rollers to decrease further to a value of 10% of the original speed.

In general, especially the control of the T.T.E. is of importance, because this is the largest and most variable part of the delay in starting. The acceleration after engagement of the clutch varies relatively little among different apparatuses. Further, the delay in starting is often of greater importance than the delay in stopping, because the delay in starting is determinative of the relation between the place and time of a document or sheet transported further upon actuation. This means that the timing of the transport of documents 10 by means of the rollers 6, 7 can be controlled much more accurately if the T.T.E. is known beforehand.

Figure 4:
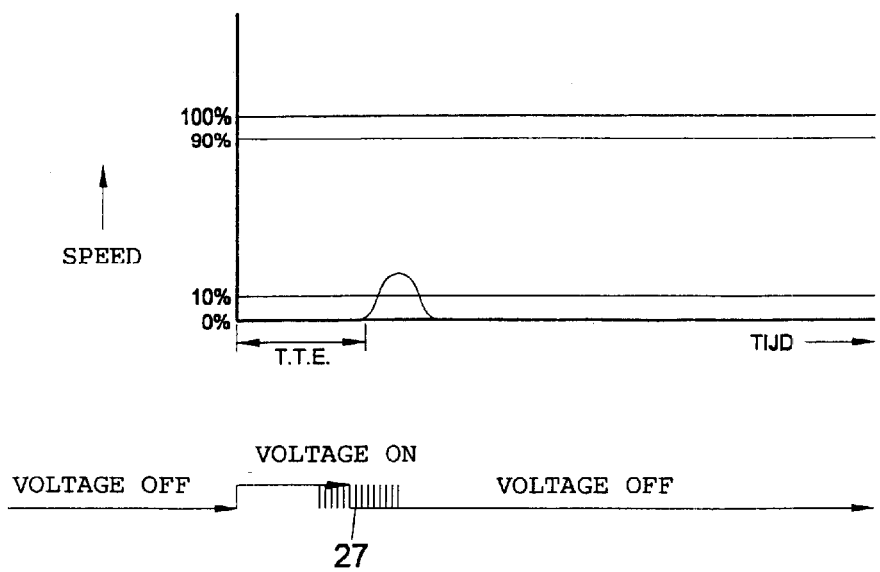
FIG. 4 is a diagram similar to FIG. 3, representing a switch-on duration of a voltage where the clutch first responds.

To be able to determine the T.T.E., the control system 11 is arranged for generating different test command pulses. The test command pulses each consist in applying the voltage across the coil 3 and removing the voltage after a time interval, so that the original voltage condition is restored. The duration of that time interval can be varied, as is indicated in FIG. 4 by the vertical lines 27. Longer and shorter test command pulses can be generated by pressing the + or − buttons of the input device 19. Further, the control system 11 is arranged for registering a command code which is representative of the duration of a selected test command pulse upon which the driven rollers 6 are first set into motion. The duration of the test command pulse of the shortest duration where the rollers 6 start to move can be registered by pressing the "OK" button of the input device 19 directly after that test command pulse. In response thereto, the control system 11 registers an associated command code. Since it is observed upon which test signal the rollers 6 start to move, delays caused by the transmission between the clutch 3 and the transporting member 6 to be eventually driven are also observed and these can also be compensated.

Upon which command duration the rollers 6 are first set into motion can be simply established by carrying out different test command pulses of mutually different command durations, and observing visually, by hand and/or even by ear, whether the rollers 6 move at least slightly. In doing so, preferably successions of consecutively longer test command pulses and shorter test command pulses are traversed to arrive at an accurate determination of the shortest test command pulse.

In operation, effecting alterations in the voltage condition is carried out at times which have been corrected to a certain extent depending on the selected command code. The control system 11 responds to the registration of a command code by accordingly setting the correction of the timing of the alteration of the voltage condition. It is possible in a simple manner and without special measuring equipment to check the setting of the control system and to adjust it, if necessary, because the detection of whether the rollers 6 move can be carried out without measuring instruments.

The duration of a test command pulse will generally not be equal to the T.T.E., because after removing the voltage on the terminal 20 the current through the coil 3 does not disappear directly and can still contribute to the displacement of the switching ring 21 such that the wrap spring 23 yet engages the driven clutch part 25. It is possible, however, to determine for an apparatus a suitable relation between the duration of the test command pulses found and suitable settings of the compensation of start and stop commands in operation.

That the control system 11 is arranged for generating test command pulses which are mutually different as regards the duration of a time interval between applying a voltage and restoring the original voltage condition provides the advantage that the duration of a test interval is simply controllable, inter alia without altering the power taken up during the command, and affords relatively much opportunity to compensate for delaying effects.

The input device 19 to which the control system 11 is coupled further comprises a display 28 for indicating a code which is representative of a generated test command pulse. This simplifies the determination of the shortest test command pulse in response to which the rollers move, in particular when different series of incrementally longer and incrementally shorter test command pulses are traversed.

Since also the adjustment of the commands used in operation is effected by applying and removing voltage across the coil 3 at an earlier or later time, the adjustment itself to can be implemented with simple means.

Especially when it is desired that the system can carry out a self-diagnosis as regards the correction of the time at which electromagnetic energizations are started and stopped, it is advantageous to use a sensor 29 for detecting movements of the rollers 6, which sensor 29 is connected with the control system 11 via a line 30. The control system 11 can then, after a particular time or a particular number of operations, switch to a service condition in which a series of test command pulses are generated and in which it is checked whether the command codes registered as a basis for corrections to be made are still adequate. When the sensor 30 after a test command pulse detects a movement of the rollers 6, this indicates that the duration of the test command pulse is long enough to cause the rollers 6 to move. Preferably, the shortest lasting test command pulse upon which some movement of the rollers 6 has been observed is taken as a basis for the determination of the correction of the moment at which voltages are operatively applied and removed to set the rollers 6 in motion and/or stop them at particular moments.

It will be clear to those skilled in the art, on the ground of what has been described hereinbefore, that the invention is not limited to the embodiments and modes as described in the example used. Thus, it is possible, for instance, to carry out the adjustment not by varying the duration of the command signal, but by varying the voltage or the curve of the voltage being applied and registering a code which indicates at which voltage or at which curve the rollers, upon a test command pulse of a given fixed duration, respond. The correction of the moment and/or the manner in which the alteration of the voltage condition in operating causing the rollers 6 to start and/or stop is then preferably obtained by correcting the height or the curve of the voltage being applied, such that a predetermined fixed delay is obtained.

It is also possible, however, to carry out test command pulses with different voltages and an equal duration of, for instance, 5–200 $\mu$m, and to use the value of the lowest voltage at which some movement of the operating member in question has been observed or detected as a measure of the duration of the correction of the earlier effectuation of alterations in the voltage relative to the intended moment at which the operating member carries out the intended movement and vice versa.

Further, using the invention, it is possible, besides compensating the delay arising when starting a transport roller 6 in response to an applied voltage, to also compensate the delay occurring in many other kinds of electromagnetically operated systems for deviations from the delay that occur in that apparatus, without necessitating special costly accurate manufacture, or testing of the system.

According to a particularly advantageous embodiment of the invention, the test command pulses are not of a successively increasing magnitude, but are generated as test command pulses of magnitudes interpolating between first and second minimum and maximum test command pulses. For instance, a third test command pulse may have a magnitude being the average of the first and second test command pulses. If the third test command pulse causes the operating member to move, the next test command pulse is the average between the first test command pulse and the third test command pulse (i.e. the average of the last test command pulse and the smallest one of the last three test command pulses) and if the third test command pulse does not cause the operating member to move, the next test command pulse is the average between the second test command pulse and the third test command pulse (i.e. the average of the last test command pulse and the largest one of the last three test command pulses). This interpolation process can for instance be continued until the difference between two successive test command pulses is below a preset minimum or until a predetermined number of interpolation steps has been taken.

Determining the smallest test command pulse causing the operating member to move by interpolation provides the advantage that the time required for determining the smallest test command pulse causing the operating member to move is relatively short and constant. In many instances another advantage is that the operating member has at least been activated once before the smallest test command pulse causing the operating member to move is operated. This reduces the influence on the delay of sticking and variations in the mechanical play in successive power transfer members.

The principle described hereinbefore can also be used for determining delays upon switching off, lowering, raising or reversing a voltage across a coil. Further, the voltage condition in which the operating member is in one or another condition can be both a direct voltage and an alternating voltage.

What is claimed is:

1. A method for electromagnetically controlling an operating member for operating the processing of objects, comprising: making an alteration larger than a minimum voltage change to an electrical voltage condition across a coil, such that the operating member for operating the processing of objects is moved, said operating member operatively responding to said alteration of said voltage condition with a delay having a duration to which a tolerance applies; further including the steps of:

generating different test command pulses having dimensions including a voltage and a duration, said test command pulses each comprising effecting an alteration of said voltage condition larger than said minimum voltage change, which test command pulses are of mutually different magnitude as regards at least one of said dimensions and at least one of said test command pulses having a duration shorter than said delay;

registering a command code in accordance with a smallest magnitude test command pulse which has caused said operating member to move; and subsequently applying corrections in accordance with said registered command code to said alterations in said voltage condition for operating said operating member when in operation.

2. A method according to claim 1, further comprising altering said corrections in response to registration of at least one other command code or another altered command code.

3. A method according to claim 1, further comprising generating test command pulses of mutually different duration and registering a command code in accordance with a test command pulse of shortest duration having caused said operating member to move.

4. A method according to claim 1, wherein said compensation is constituted by effecting said alteration earlier or later with respect to a basic time.

5. A method according to claim 1, wherein at least after generating at least one of said test command pulses, a code is signaled in a humanly perceptible form, which code is representative of the generated test command pulse.

6. A method according to claim 1, wherein said test command pulses are influenced by inputting commands into a control system.

7. A method according to claim 1, wherein in a service condition said test command pulses are selectively increased or reduced.

8. A method according to claim 1, further comprising detecting movement of said operating member and automatically registering said command code in response to observing or detecting movement of said operating member.

9. A method according to claim 8, wherein each time after a particular operating time, automatically a switch is made to a service condition in which it is verified whether said command code agrees with responses of said operating member to test command pulses and wherein, in response to establishing that said agreement is not correct or not optimal, said command codes are brought into agreement with the behavior of said operating member in response to said test command pulses.

10. A method according to claim 1, wherein said minimum magnitude test command pulse causing said operating member to move is determined by generating successive test command pulses interpolating between predetermined minimum and maximum magnitude test command pulses.

* * * * *